(12) United States Patent
Hibbert et al.

(10) Patent No.: US 7,360,618 B2
(45) Date of Patent: Apr. 22, 2008

(54) SNOWMOBILE TRACK SUSPENSION

(75) Inventors: Kirk D. Hibbert, Goodridge, MN (US); Russell Ebert, Lake Shore, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 433 days.

(21) Appl. No.: 11/061,117

(22) Filed: Feb. 18, 2005

(65) Prior Publication Data
US 2006/0185919 A1    Aug. 24, 2006

(51) Int. Cl.
*B62M 29/00* (2006.01)
(52) U.S. Cl. ..................................... 180/193
(58) Field of Classification Search ................. 180/193
See application file for complete search history.

(56) References Cited
U.S. PATENT DOCUMENTS
4,222,453 A    9/1980 Fixsen et al.
5,692,579 A *  12/1997 Peppel et al. ............... 180/190
6,206,124 B1 *  3/2001 Mallette et al. ............. 180/193

* cited by examiner

*Primary Examiner*—Lesley D. Morris
*Assistant Examiner*—Michael Stabley
(74) *Attorney, Agent, or Firm*—Black Lowe & Graham, PLLC (57) ABSTRACT

A snowmobile track suspension is disclosed. The track suspension includes a chassis, a skid frame, a front arm, an idler arm, and a rear arm. The chassis includes a tunnel. The skid frame includes rails along which the track rides. The front arm has a forward end pivotally and slidably connected to the tunnel. The front arm also includes a rearward end pivotally connected to the rails. The idler arm includes a forward end pivotally connected to the tunnel and a rearward end connected to the rear arm. Such connection is at the upper end of the rear arm, with the lower end of the rear arm pivotally coupled to the rails.

35 Claims, 8 Drawing Sheets

PRIOR ART

PRIOR ART

SNOWMOBILE TRACK SUSPENSION

FIELD OF THE INVENTION

This invention relates generally to suspension systems for track-driven vehicles and, more specifically, to snowmobile track suspension front-arm linkages.

BACKGROUND OF THE INVENTION

Snowmobile track suspensions employ linkage arms and springs between the chassis tunnel and the skid-frame rails, which provide the path for track rotation and energy transfer from the ground to the chassis. In one typical arrangement trailing front and rear arm linkages are pivotally secured at their front (upper) ends to the chassis tunnel. The rear (lower) ends of the linkage arms are pivotally secured to the skid-frame rails. At the rear, lower end the attachment is also through a loss-motion linkage connection. A spring is typically coupled between the tunnel and the skid frame adjacent to the rear link. A spring is also secured between the upper end of the front arm and the skid frame. Essentially, this arrangement allows for no pitch control. With the addition of the coupling system, a system that couples the rear and front suspension arms together, a sprung four-bar-linkage arrangement is created. Thus, when either of the arms is pivoted due to a bump (for example) the chassis tunnel is shifted forwardly relative to the skid-frame rails and the other arm is thereby pivoted, compressing the entire suspension. Such compression creates loss of traction and can create a rougher ride as the suspension does not conform well to terrain transitions. For example, if the rear end of the track is on a bump, the track front is also raised, releasing it from positive traction on the snow surface.

Some attenuation of this four-bar-linkage effect is achieved as the rear arm actually comprises two interconnected linkages: a rear arm and an idler arm. This rear/idler arm arrangement allows some suspension compression at the rear end of the track without forward shifting of the tunnel relative to the rails. However, to prevent the front end of the snowmobile from excessive lift under strong acceleration, rear arm coupler blocks limit movement of the rear arm. Once the blocks stop the rear arm movement, further compression of the suspension causes the idler arm to move the tunnel forward relative to the rails. Such forward tunnel movement also pushes the front arm into a more laid down position, compressing the front track suspension. Since both springs are compressed during such suspension action, attempts to solve the problem have focused on the provision of a softer front spring to keep the overall suspension stiffness within an acceptable range.

The problem also limits coupler block settings to achieve desirable suspension action. For quick, stable acceleration, a close coupler block setting is needed. However, if the blocks are set too close, the rear arm range of motion is excessively limited and the idler arm compresses the whole suspension by pushing the chassis forward relative to the skid frame as discussed above.

A further related problem is encountered once the idler arm is compressed to the point that it goes over-center. The arm may be temporarily locked into the compressed state by the upward force on the front arm. The tunnel connection to the front end of the idler arm pushes the arm downward, as the front spring resists the compression that would have to occur to allow the idler arm to lift. Since the idler arm is over-center, initial lifting of the arm would cause the chassis to move forward relative to the skid-frame—compressing the track front suspension—until the idler arm crosses back from the over-center position.

In certain suspension configurations, full rear track suspension action is limited by the front arm arrangement. Once the front shock is compressed to the point that the front arm is parallel to the rails further rear suspension travel is stopped. In this parallel position, the tunnel is not able to shift relative to the rails. Therefore, the rear idler arm cannot further move, as such movement would require the tunnel to shift forward.

Due to the drawbacks inherent in the current suspension arrangements, a system for improved traction, steering, and bump absorption is needed.

SUMMARY OF THE INVENTION

The suspension of the present invention solves the challenges presented above with a loss-motion linkage added to the front arm. The system is inexpensive to manufacture and robust. The track suspension is better able to follow terrain changes and overcomes the problems of suspension lockout.

The present invention provides a track suspension for a snowmobile. The snowmobile includes a chassis and a skid frame with at least one rail. The track suspension includes a front arm and a rear arm. The front arm has a first end and a second end. The first end is strictly coupled to the chassis. The second end is pivotally coupled to the rail. At least one of the first and second ends is coupled with a front arm link. The rear end also has first and second ends. The first end of the rear arm is strictly coupled to the chassis. The second end of the rear arm is pivotally coupled to the rail. At least one of first and second ends of the rear arm is pivotally coupled with a rear arm link. In one aspect of the invention, the front arm link is a slider link. The rear arm link is an idler arm pivotally interconnected between the chassis and the rear arm. A coupler block is fixed to the rail. The coupler block limits the movement of the rear arm. In accordance with further aspects of the invention, the snowmobile has fore and rear portions. The front arm first end is coupled to the chassis forward of the second end, which is coupled to the rail.

In accordance with another aspect of the invention, the slider link includes a channel formed in one end of the front arm. The channel forms a U-shape having an open outer end. Preferably, the channel is formed in the first end of the front arm for connection to the chassis. The outer end is slidably coupled to a pivot bushing affixed to the chassis. One aspect of this embodiment includes the front arm having a longitudinal axis wherein the channel has a slide patch generally aligned with such longitudinal axis.

In accordance with still further aspects of the invention, a rear arm link is interconnected between the chassis and the rear arm. The rear arm link is an idler arm having a first end pivotally coupled to the chassis and a second end pivotally coupled to the rear arm.

The present invention may also be defined as a snowmobile track suspension including a chassis, a skid frame, front arm, and a rear arm. The chassis includes a tunnel. The skid frame has at least one rail. The front arm has an upper end pivotally coupled to the tunnel and a lower end pivotally coupled to the rail. At least one of the upper and lower ends is coupled with a link. The rear arm has an upper end pivotally coupled to the tunnel and a lower end pivotally coupled to the rail. As with the front arm, at least one of the upper and lower ends of the rear arm is coupled with a link.

In a preferred aspect of the invention, the front arm link is a slide link secured to the first end of front arm at the chassis connection.

In accordance with further aspects of the invention, a track suspension for a snowmobile is provided. Snowmobile includes a chassis and a skid frame with at least one rail on the skid frame. The rail includes a longitudinal axis and the snowmobile includes a forward end and a rearward end. The track suspension includes a linkage arm having a first end coupled to the chassis and a second end coupled to the rail. The ends of the linkage arm are pivotally coupled to the chassis and rail about axis substantially transverse to the longitudinal axis of the rail. At least one of the first and second ends is slidably coupled so as to move forward and rearward relative to at least one of the chassis and the skid frame.

In a further aspect of this embodiment of the invention, a second linkage arm is coupled between the chassis and the rail. A loss-motion connector link is secured to the second linkage arm, the loss-motion connector link being a link arm secured between the second linkage and the chassis.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

The present invention will now be described in connection with FIGS. 1-8. The invention is directed towards a suspension system for a snowmobile 10. Those skilled in the art will appreciate the basic construction of snowmobile 10 as including a chassis 12 with a tunnel 14. A body 16 and a seat 18 are secured to chassis 12 along with other standard or optional components. Skis 20 are interconnected to chassis 12 through front suspension 22.

Figure 1:
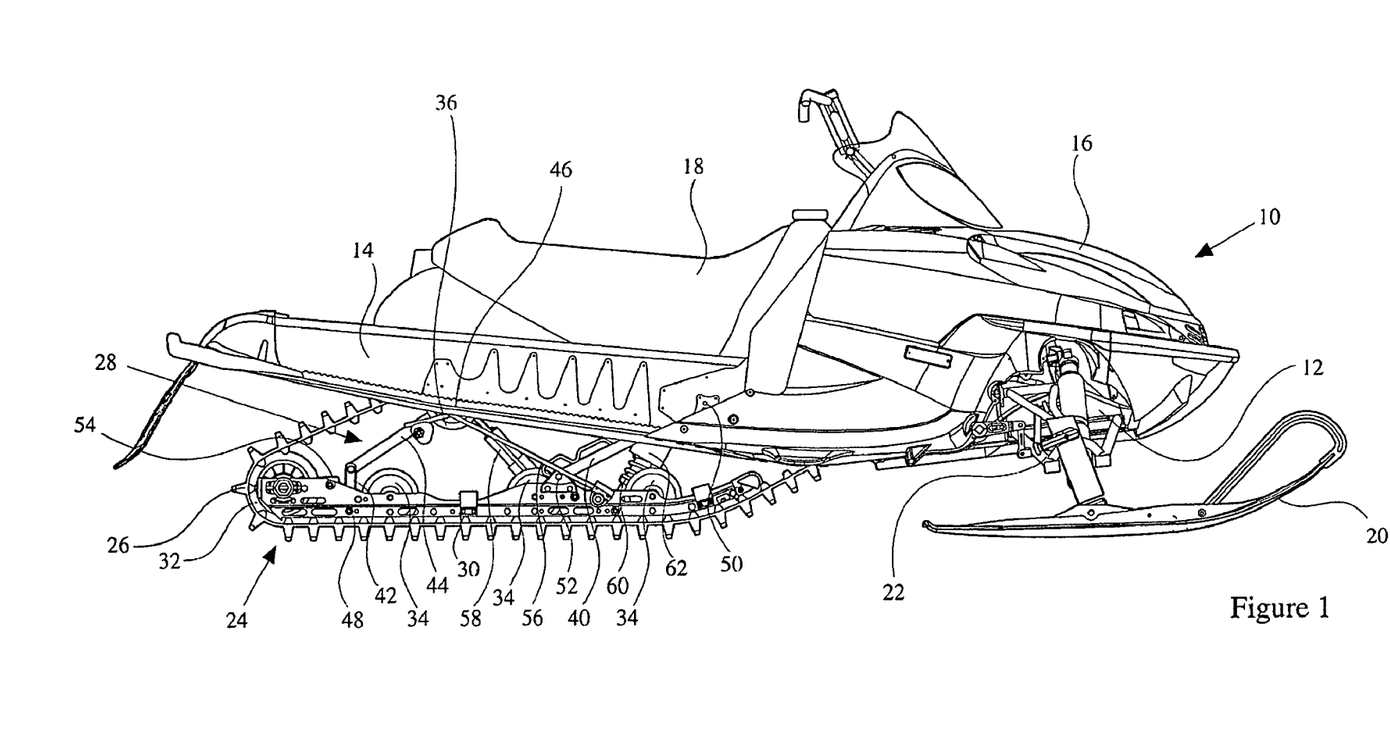
FIG. 1 is a side-elevational view of a snowmobile having a suspension system of the present invention.

Snowmobile 10 further includes a skid frame 24 and track 26 interconnected to tunnel 14 through rear suspension 28. Skid frame 24 includes rails 30. Rails 30 are preferably constructed of metal with a wear strip along the bottom thereof. The suspension components are secured to rails 30 or to cross braces between rails 30 (the entire assembly making up skid frame 24). Track 26 is slidably engaged with rails 30 as well as being engaged with several idler wheels and a drive sprocket as described below. A rear idler wheel 32 is pivotally secured to the rearward end of rails 30. Note that while the figure shows side-elevational views, multiple idler wheels are secured along the same axis in each case in the preferred embodiment. Thus, two rear idler wheels 32 are secured on a common axis to two rails 30, which run parallel to one another. Track 26 changes its direction of travel as it rotates around rear idler wheel 32 at the rear end of skid frame 24.

Multiple mid-idler wheels 34 are also secured along intermediate portions of rails 30. Mid-idler wheels 34 are secured between rails 30 and have an outer portion that contacts the inner sides of track 26. As with rear idler wheel 32, mid-idler wheels 34 are preferably in pairs along common axes.

Upper idler wheels 36 are also provided at the upper end of rear suspension 28 in order to guide track 26 above rear suspension 28. Upper idler wheels 36 are pivotally secured to tunnel 14 of chassis 12.

After passing over upper idler wheels 36, track 26 extends forward to drive sprockets 38. Drive sprocket 38 is hidden in FIG. 1, but shown in the remaining figures. Drive sprocket 38 engages track 26 to drive it along skid frame 24 around rear idler wheel 32 and upper idler wheel 36 then back to drive sprocket 38. Drive sprocket 38 is driven by the engine, which is secured to chassis 12 of snowmobile 10.

Figure 2:
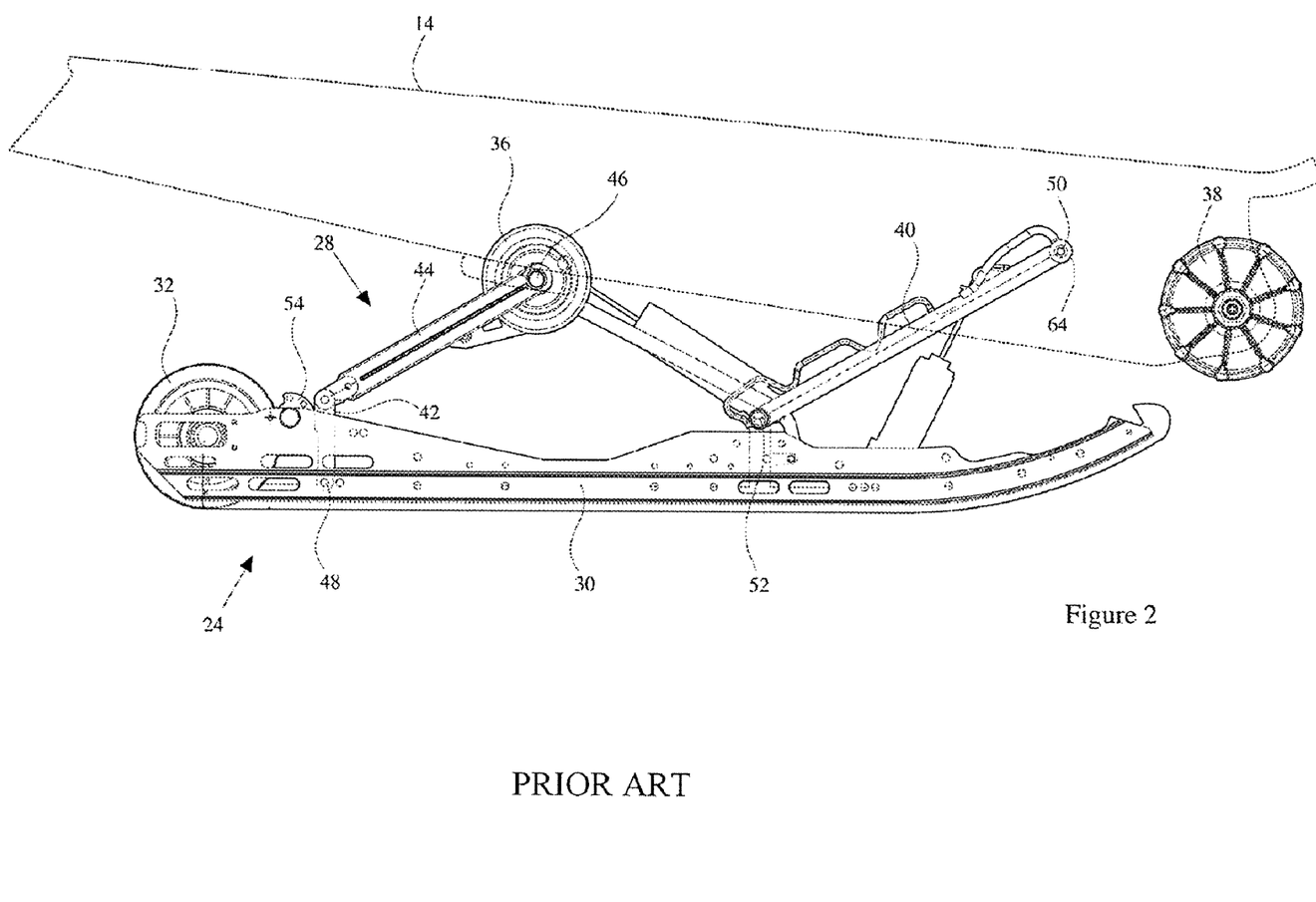
FIG. 2 is a side-elevational view of a portion of the track suspension showing the linkages in an uncompressed state with a non-slider front arm pivot.
Figure 3:
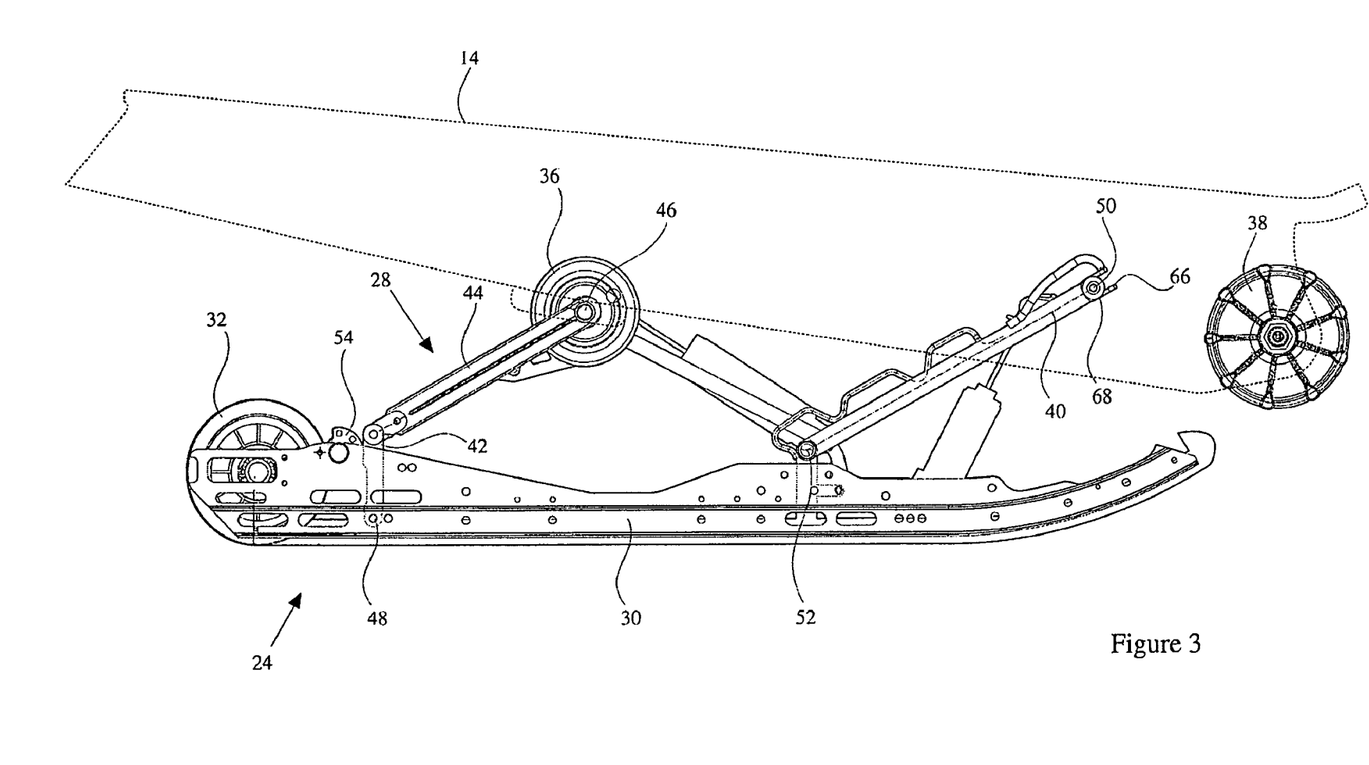
FIG. 3 is a side-elevational view of a portion of the track suspension showing the linkages in an uncompressed state with a slider linkage front arm pivot.

Referring to FIGS. 1 through 3, skid frame 24 is suspended beneath tunnel 14 with multiple linkage arms that, when combined with springs and shock absorbers, make up rear suspension 28. The various arms include a front arm 40, a rear arm 42, and an idler arm 44. Idler arm 44 is interconnected between a rear tunnel pivot 46 and rear arm 42, also with a pivotal connection thereto. Rear tunnel pivot 46 is the same pivot that holds the shaft securing upper idler wheel 36 over which track 26 rides. Idler arm 44, being pivotally connected about rear tunnel pivot 46, extends rearward and downward toward the rearward end of rails 30. The lower end of idler arm 44 is pivotally connected to the upper end of rear arm 42. Rear arm 42 extends downwardly from its pivotal connection with idler arm 44 to a pivotal connection with rear rail pivot 48. Rear rail pivot 48 is an interconnection with the rearward end of rails 30, preferably between the rearward most of mid-idler wheels 34 and rear idler wheel 32.

Front arm 40 is pivotally secured at its upper end to front tunnel pivot 50 rearward of the connection of drive sprockets 38 to chassis 12. Front arm 40 extends rearward and downward to a pivotal connection with front rail pivot 52 secured at a forward portion on rails 30.

The provision of two interconnected arms (rear arm 42 and idler arm 44) in the aft portion of rear suspension 28 allows some independent movement of the fore and aft portions of rear suspension 28. Absent the interconnected rear and idler arms 42 and 44, rear suspension 28 would simply be a four-bar-linkage arrangement wherein movement of front arm 40 or rear arm 42 would necessarily result in complimentary movement of the other of the arms. Thus, the rear suspension 28 would not be as compliant and able to articulate over uneven terrain. However, snowmobile manufacturers have found that completely unrestricted movement of rear arm 42 may create a situation where the front end of the snowmobile lifts excessively from the riding surface. This may occur, for example, under heavy acceleration where the forward momentum compresses the aft portion of rear suspension 28 causing the front of the snowmobile to ride light on the surface and severely understeer. In order to counter this situation, coupler blocks 54 have been secured to rails 30 to bear against rear arms 42 after a certain initial compression of rear suspension 28. Once rear arm 42 contacts coupler block 54, the suspension action stiffens.

In the prior-art suspension system as illustrated in FIG. 2, once the coupler block is engaged, the suspension becomes a four-bar-linkage arrangement. In this prior-art arrangement, the upper end of front arm 40 includes a non slide end 64 that is pivotally secured at the front tunnel pivot 50. Note that idler arm 44 is pivotally secured at rear tunnel pivot 46, such that the distance between the upper ends of idler arm 44 and front arm 40 is fixed. Also note that the lower ends are fixed to rail 30. Thus, when initial compression moves rear arm 42 rearward against coupler block 54, additional compression of rear suspension 28 is controlled by the four-bar-linkage between idler arm 44, front arm 40, tunnel 14, and rail 30.

Rear suspension 28 also includes springs and shock absorbers interconnected with the above-described linkage arms 40 through 44. As seen in FIG. 1, a rear springs 56 are coupled between idler arm 44, tunnel 14, and rails 30. In the preferred embodiment, rear springs 56 are torsion springs with ends that extend outwardly for engagement on their forward ends with rails 30 and on their rearward ends with idler link 44. Thus, rear springs 56 push tunnel 14 away from skid frame 24. Alternate spring arrangements may be used such as coil springs or air springs. A rear shock absorber 58 is also provided extending between rails 30 and tunnel 14. In the preferred embodiment, shock absorber 58 extends between a mid-portion of rails 30 up to a connection with an upper end of idler arm 44 near its connection to rear tunnel pivot 46.

A front spring 60 and front shock absorber 62 are also preferably provided to urge the front portion of rails 30 away from the front portion of tunnel 14. Preferably, front spring 60 is a coil spring engaged over front shock absorber 62. Front shock absorber 62 extends from a forward portion of rails 30 to an upper portion of front arm 40.

Note in FIGS. 2-8 that several components are not illustrated for the purposes of clarity illustration of the linkages and their potential movements.

Referring specifically to FIG. 2, the prior-art interconnection of the upper end of front arm 40 to tunnel 14 is illustrated. This is carried out with a simple pivotal connection to tunnel 14 at front tunnel pivot 50. The upper end of front arm 40 includes a non-slide end 64 pivotally secured at front tunnel pivot 50. Thus, as explained above, once rear arm 42 contacts coupler block 54, further compression of rear suspension 28 is controlled with essentially a four-bar-linkage arrangement made up of tunnel 14, front arm 40, idler arm 44, and rails 30. Thus, if a rearward portion of rail 30 is pushed upwardly by a bump in the terrain, for example, the forward portion of rail 30 is also brought upwardly due to the necessary movement brought about by tunnel 14 and thus tunnel pivots 46 and 50. If the forward upper end of front arm 40 is moved forward relative to rails 30, the lower rearward end of arm 40 must move upwardly.

FIG. 3 illustrates the preferred embodiment of the suspension of the present invention. In this embodiment, the upper end of front arm 40 is provided with a slider link end 66. Slider link end 66 is preferably a U-channel within which front tunnel pivot may both pivot and slide. In the preferred embodiment, slider link end 66 forms a channel extending along a longitudinal axis of front arm 40. However, this channel may alternatively extend along other directions not parallel to or along the longitudinal axis of front arm 40. A bushing 68 is also secured to front tunnel pivot 50 to allow both sliding and pivotal movement at the upper end of front arm 40.

Slider link end 66 essentially creates a loss-motion link at the upper end of front arm 40. In this embodiment, a slide link is created. However, a link arm could alternatively be used in this situation. Such a link arm would, in one possible embodiment, be situated between the upper end of front arm 40 and front tunnel pivot 50. Thus, loss-motion links are provided at both the forward portion of rear suspension 28 (with slider link end 66) and the aft portion of rear suspension 28 (with rear arm 42 coupled to idler arm 44).

In still a further alternate embodiment, the link may be provided at the lower end of front arm 40. In any case, a loss-motion link is provided thus allowing additional freedom of movement of rear suspension 28 to better conform to the terrain being ridden for improved traction, and smooth riding. Such suspension action will be further described below in connection with FIGS. 4 through 8.

Figure 4:
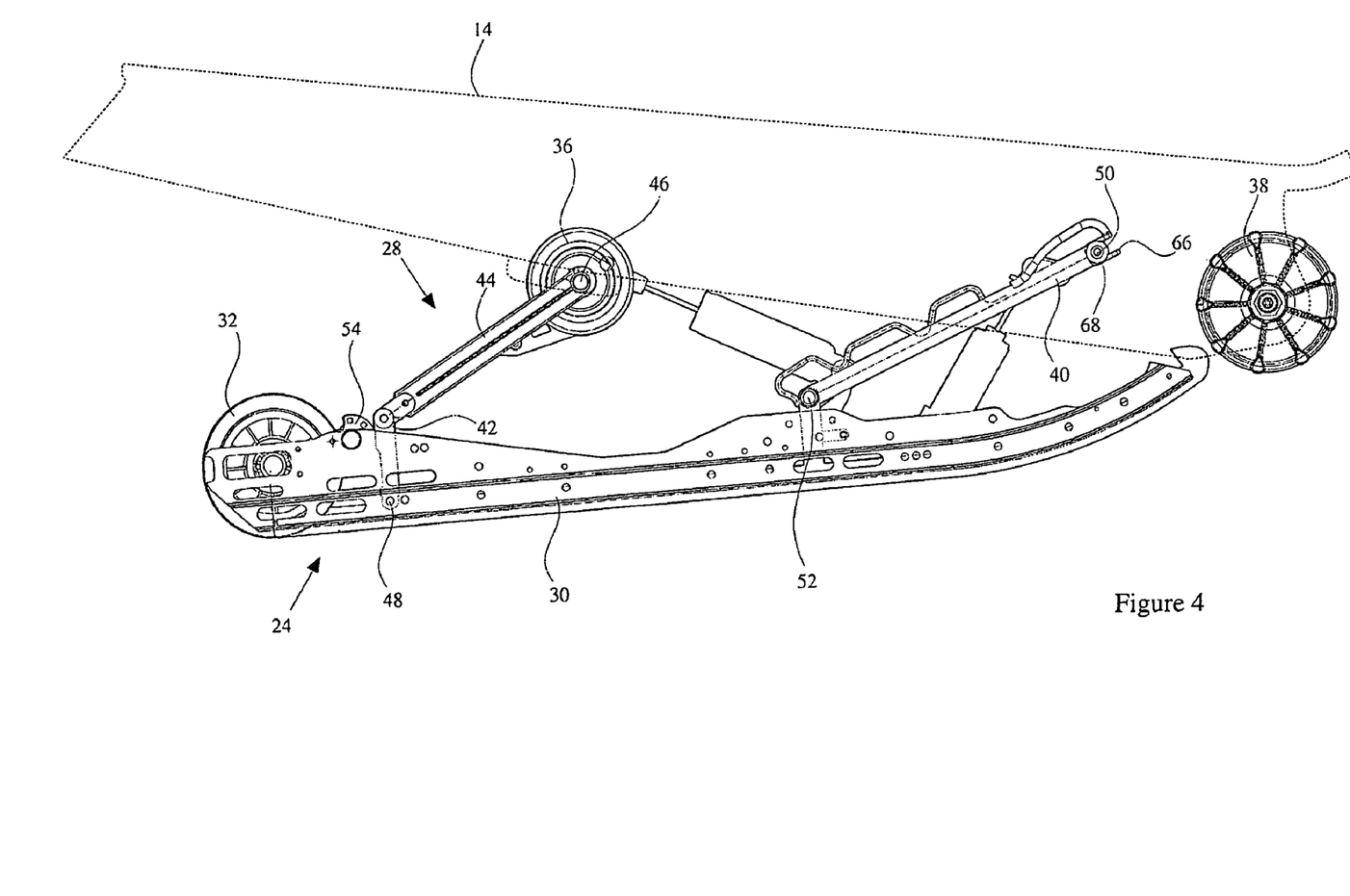
FIG. 4 is a side-elevational view of the suspension linkages with the front partially compressed.

FIG. 4 illustrates the situation in which the front portion of rear suspension 28 encounters a bump and is pushed upward relative to tunnel 14. In this encounter, front rail pivot 52 moves upward relative to tunnel 14 thus pushing tunnel 14 forward relative to rail 30. Front tunnel pivot 50 remains in the rearward-most portion of the channel formed at slider link ends 66. The rear portion of skid frame 24 is not necessarily pulled upward as rear arm 42 is allowed to swing forward to increase the distance between rear rail pivot 48 and rear tunnel pivot 46.

Figure 5:
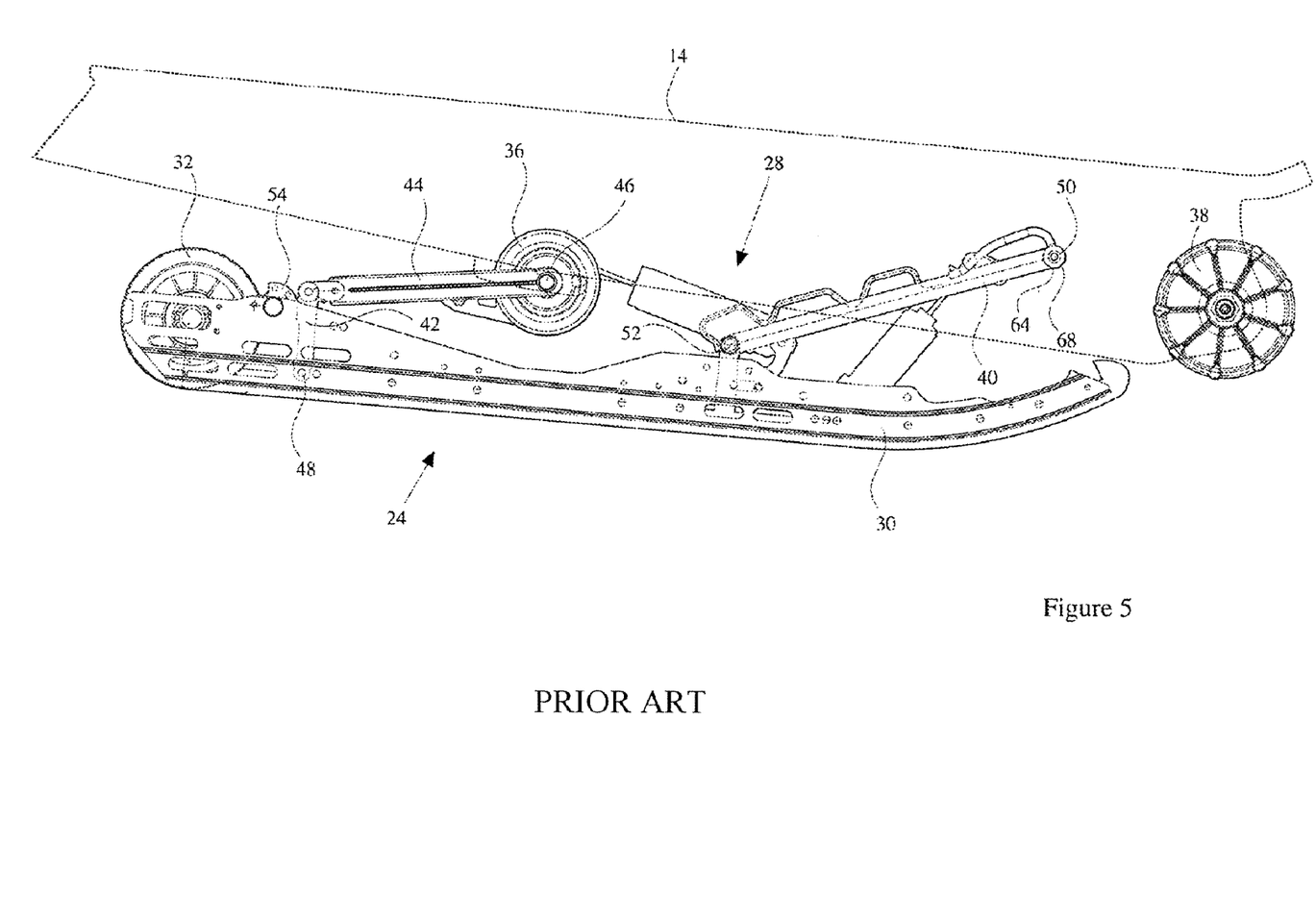
FIG. 5 is a side-elevational view of the suspension linkages with the rear compressed and the front partially compressed.
Figure 6:
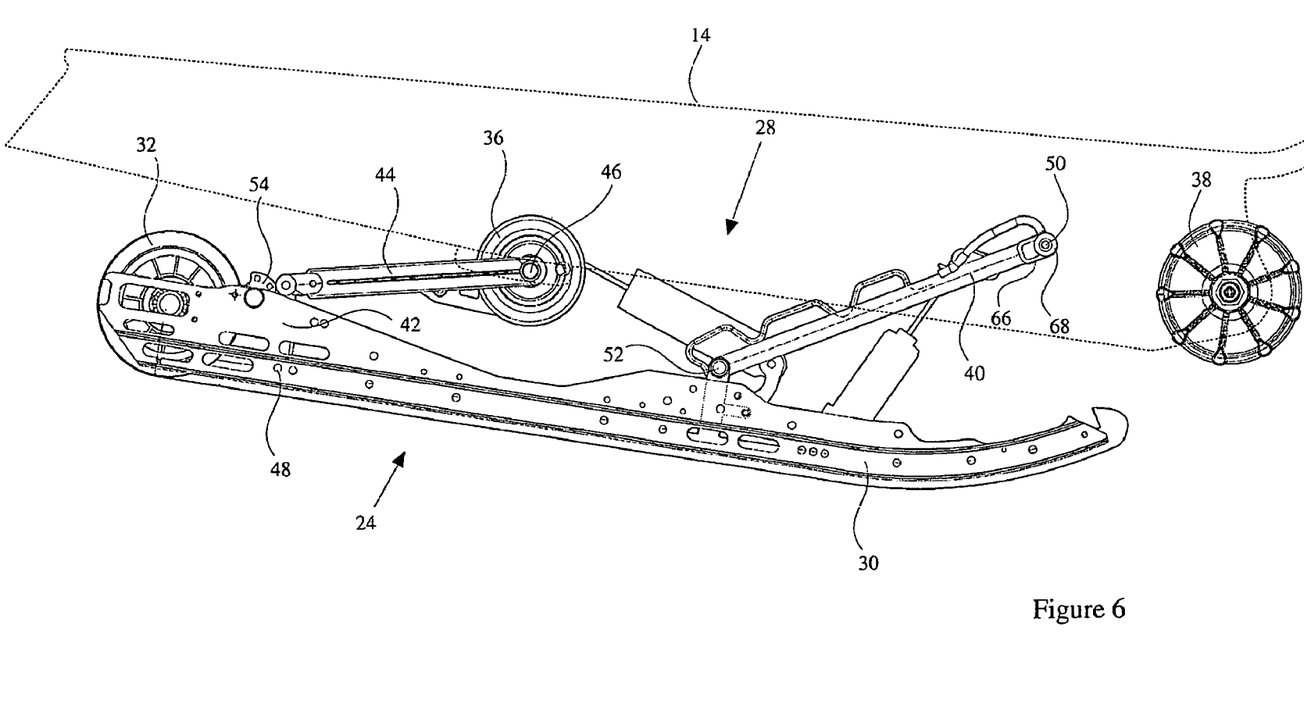
FIG. 6 is a side-elevational view of the suspension linkages with the rear compressed and the front substantially uncompressed.

FIGS. 5 and 6 illustrate a situation in which the rearward portion of rear suspension 28 is compressed upward relative to tunnel 14. In FIG. 5, the forward portion of rear suspension 28 is also unnecessarily compressed. This is due to the prior-art arrangement that does not include the slider link end 66, but is simply pivotally and non-slidably connected at the upper end of link arm 40. Thus, even without terrain compressing the front of suspension 28, it would be pulled up by excessive compression at the rear of suspension 28.

FIG. 6 illustrates how the present invention allows a forward portion of rails 30 to better follow the terrain even upon a large compression of the rear portion of suspension 28. In this situation, a forward portion of rails 30 is able to drop to follow the terrain more accurately since front tunnel pivot 50 is able to slide to an upper-most portion of slider link end 66. Thus, as coupled idler link 44 pushes tunnel 14 forward relative to skid frame 24, front tunnel pivot 50 does not pull upwardly on front arm 40. Thus, a more compliant suspension is created. In the prior-art situation in which the rear portion of rails 30 is compressed, the front portion is also brought up. This not only limits the track from following the terrain more accurately, but it creates an overall stiff suspension as both the front and rear springs 60 and 56 must be compressed together.

Figure 7:
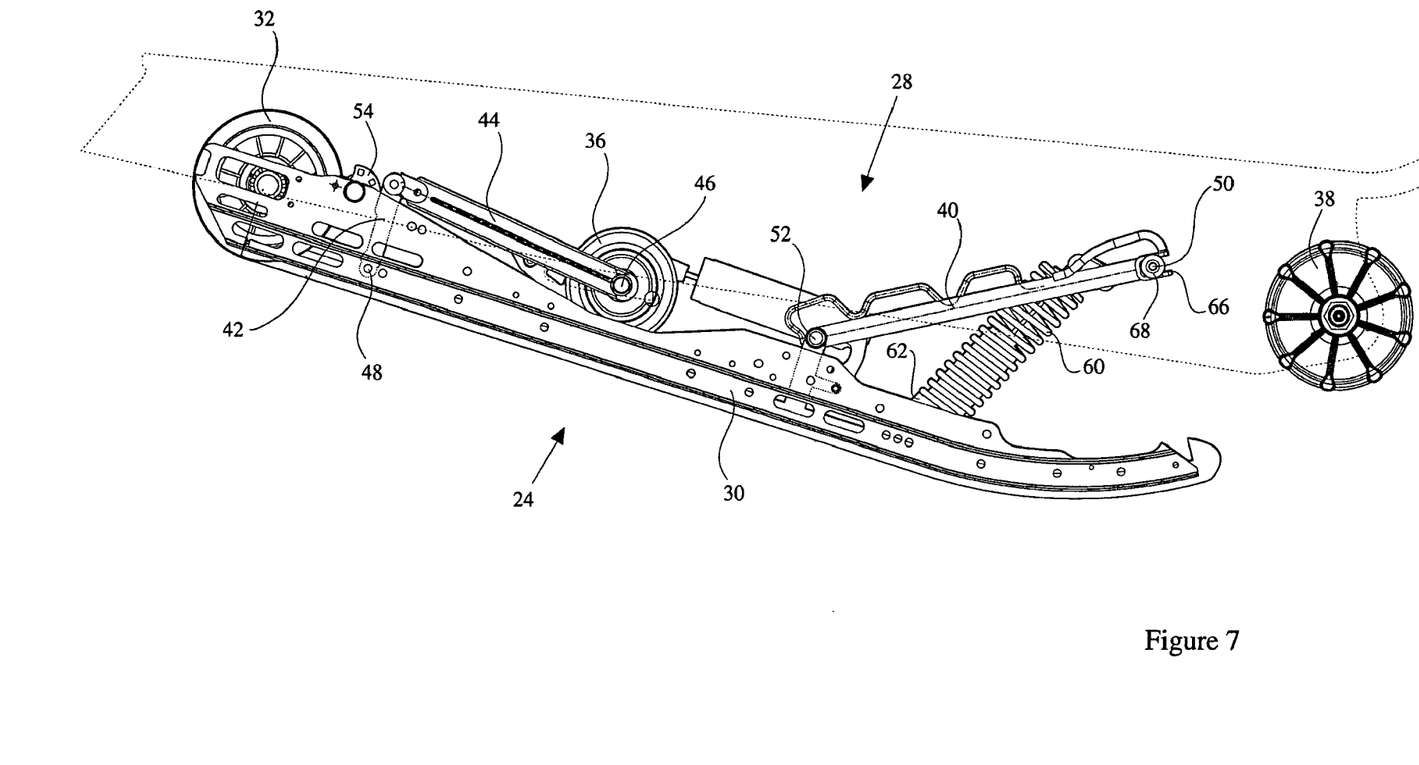
FIG. 7 is a side-elevational view of the suspension linkages with the rear arm in an over-center position.

FIG. 7 illustrates another advantage of the present invention over the prior art. In the situation in which large rear suspension compression occurs such that idler arm 44 compresses to an over-center position, a suspension lock-out occurs with the prior-art arrangement. Movement back from the over center condition of idler arm 44 would cause a forward shift of tunnel 14. This is resisted by spring 60 in the prior art arrangement holding front arm 40 in upward configuration not allowing front tunnel pivot 50 to move forwardly. Thus, smooth suspension action is diminished as the movement from over-center compresses the front suspension. However, as illustrated in FIG. 7, the slider link of the present invention allows forward movement of front tunnel pivot 50 relative to front arm 40 such that front tunnel 14 may move forward without compression of spring 60. Therefore, idler arm 44 is able to move back from its over-center position without resistance from spring 60.

Figure 8:
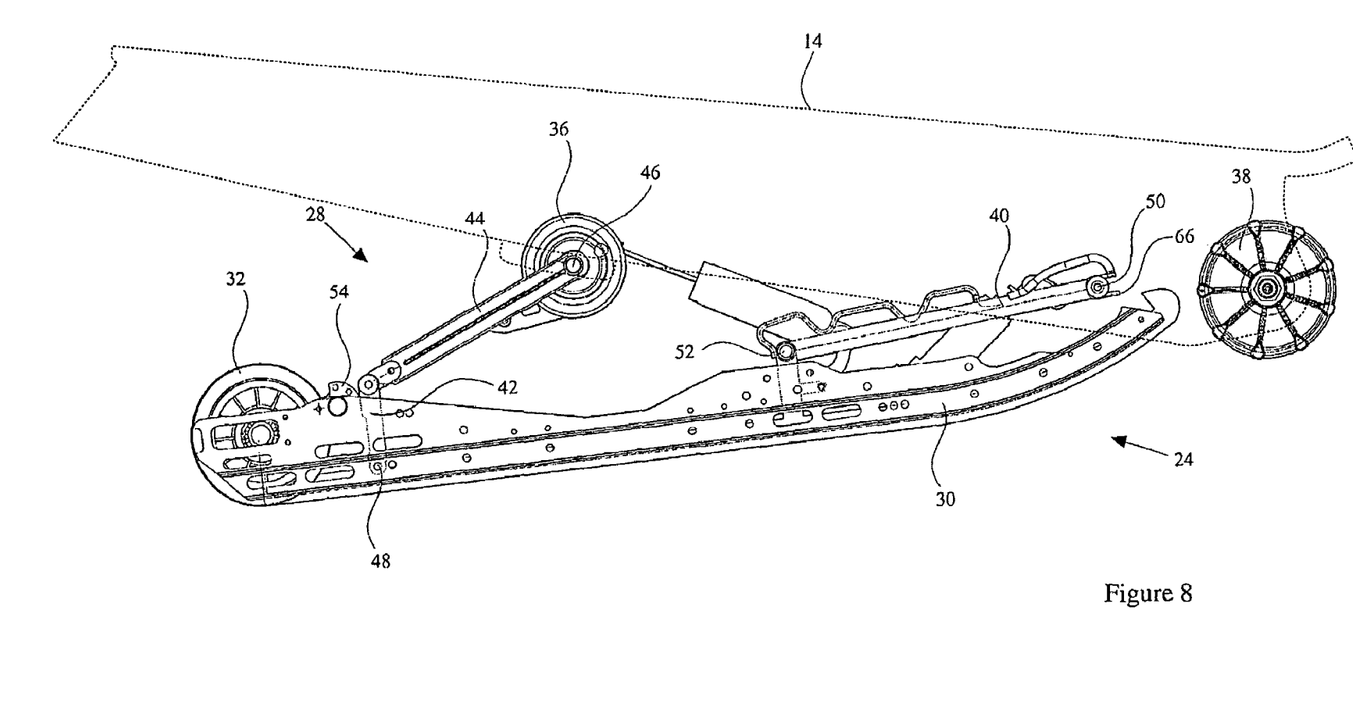
FIG. 8 is a side-elevational view of the suspension linkages with the front arm substantially parallel to the rail.

FIG. 8 also illustrates an advantage of the present invention where front arm 40 may not allow additional movement of idler arm 44 and rear arm 42 in certain situations. This is a situation in which front arm 40 is substantially parallel to rails 30. In this situation, when coupler block 54 is engaged with rear arm 42, any further suspension movement if idler arm 44 is inhibited. This is because movements of tunnel 14 relative to rails 30 is inhibited. However, slider link end 66 allows front tunnel pivot 50 to move thus allowing idler arm 44 to further compress as needed, thus shifting front tunnel pivot 50 forwardly relative to front arm 40.

While the preferred embodiment of the invention has been illustrated and described, as noted above, many changes can be made without departing from the spirit and scope of the invention. For example, instead of a slider link, a link arm may be interconnected at either end of front arm 40 to connect such end to either the tunnel or the rail. Alternately, a slider link may be provided at the rearward lower end of front arm 40. Further alternative embodiments envisioned may include slider links and rear arm 42 or idler arm 44. Accordingly, the scope of the invention is not limited by the disclosure of the preferred embodiment. Instead, the invention should be determined by reference to the claims that follow.

The embodiments of the invention in which an exclusive property or privilege is claimed are defined as follows:

1. A track suspension for a snowmobile having a chassis and a skid frame with at least one rail, the track suspension comprising:
   a. a front arm having a first end pivotally coupled to the chassis and a second end pivotally coupled to the rail, at least one of said first and second ends being coupled with a front-arm link, said front-arm link allowing both pivotal and translational movement of at least one of said first and second ends of said front arm; and
   b. a rear arm having a first end pivotally coupled to said chassis and a second end pivotally coupled to said rail, at least one of said first and second ends being coupled with a rear-arm link.

2. The track suspension of claim 1, wherein said front-arm link is a slider link.

3. The track suspension of claim 1, wherein said rear-arm link is an idler arm pivotally interconnected between said chassis and said rear arm.

4. The track suspension of claim 3, further comprising a coupler block fixed to said rail, said coupler block limiting movement of said rear arm.

5. The track suspension of claim 3, wherein said snowmobile has fore and rear portions and wherein said front arm first end is coupled to said chassis forward of said second end coupled to said rail.

6. The track suspension of claim 1, wherein said slider link comprises a channel formed in at least one of the first and second ends of said front arm.

7. The track suspension of claim 6, wherein said channel forms a "U" shape having an open outer end.

8. The track suspension of claim 6, wherein said channel is formed in the first end of said front arm.

9. The track suspension of claim 8, wherein said channel forms a "U" shape having an open outer end, said outer end being slidably coupled to a pivot bushing fixed to said chassis.

10. The track suspension of claim 8, wherein the snowmobile has fore and rear portions and wherein said front arm first end is coupled to said chassis forward of said second end coupled to said rail.

11. The track suspension of claim 6, wherein said front arm has a longitudinal axis and wherein said channel has a slide path generally aligned with said longitudinal axis of said front arm.

12. The track suspension of claim 1, wherein said first end of said front arm is coupled to the chassis with a front-arm link.

13. The track suspension of claim 12, wherein the snowmobile has fore and rear portions and wherein said front arm first end is coupled to said chassis forward of said second end coupled to said rail.

14. The track suspension of claim 13, wherein said rear-arm link is interconnected between said chassis and said rear arm.

15. The track suspension of claim 14, wherein said rear-arm link is an idler arm having a first end pivotally coupled to said chassis and a second end pivotally coupled to said rear arm.

16. The track suspension of claim 15, wherein said front-arm link is a slide coupling.

17. The track suspension of claim 15, further comprising a coupler block fixed to said rail, said coupler block limiting rearward movement of said rear arm.

18. A snowmobile track suspension comprising:
   a. a chassis having a tunnel;
   b. a skid frame having at least one rail;
   c. a front arm having an upper end pivotally coupled to said tunnel and a lower end pivotally coupled to said rail, at least one of said upper and lower ends being coupled with a link, said link allowing both pivotal and translational movement of at least one of said upper and lower ends of said front arm; and
   d. a rear arm having an upper end pivotally coupled to said tunnel and a lower end pivotally coupled to said rail, at least one of said upper and lower ends being coupled with a link.

19. The snowmobile track suspension of claim 18, wherein said front-arm link is a slide link.

20. The snowmobile track suspension of claim 19, wherein said slide link is secured to the first end of said front arm.

21. The snowmobile track suspension of claim 19, wherein said slide link comprises a channel fixed to said front arm.

22. The snowmobile track suspension of claim 21, wherein said front arm has a longitudinal axis, said channel allowing translational movement along a path generally parallel to said front arm longitudinal axis.

23. The snowmobile track suspension of claim 21, wherein said channel includes an outer open end.

24. The snowmobile track suspension of claim 19, wherein said rear-arm link is an idler arm having a first end pivotally coupled to said tunnel and a second end pivotally coupled to said rear arm.

25. The snowmobile track suspension of claim 24, further comprising a coupler block secured to said rail, said coupler block being disposed adjacent said rear link to limit rearward movement of said rear link.

26. A snowmobile track suspension comprising:
   a. a chassis having a tunnel;
   b. a skid frame having rails;

c. a front arm having a forward end pivotally and slidably connected to said tunnel and a rearward end pivotally connected to said rails;
d. an idler arm having a forward end pivotally connected to said tunnel and a rearward end; and
e. a rear arm having an upper end pivotally connected to said idler arm and a lower end pivotally coupled to said rails.

27. The snowmobile track suspension of claim 26, wherein the slidable connection between said front arm and said tunnel comprises a channel fixed to the forward end of said front arm.

28. The snowmobile track suspension of claim 27, wherein said front arm has a longitudinal axis and wherein said channel is configured to allow translational movement along a path generally parallel to said front arm longitudinal axis.

29. A track suspension for a snowmobile having a chassis and a skid frame with at least one rail having a longitudinal axis, the snowmobile having a forward end and a rearward end, the track suspension comprising a front linkage arm having a first end coupled to the chassis and a second end coupled to the rail, said ends being pivotally coupled to the chassis and rail about axes substantially transverse to the longitudinal axis of the rail, wherein at least one of said first and second ends is slidably coupled so as to move forward and rearward relative to at least one of the chassis and the skid frame.

30. The track suspension of claim 29, wherein said first end of said front linkage arm is slidably coupled to the chassis.

31. The track suspension of claim 30, wherein said first end of said linkage includes a channel, said channel being slidably coupled to the chassis.

32. The track suspension of claim 31, wherein said linkage arm has a longitudinal axis and wherein said channel is configured to allow translational movement along a path generally parallel to said front arm longitudinal axis.

33. The track suspension of claim 29, further comprising a rear linkage arm coupled between said chassis and said rail.

34. The track suspension of claim 33, further comprising a loss-motion connector link secured to said second linkage arm.

35. The track suspension of claim 34, wherein said loss-motion connector link comprises a loss-motion link arm secured between said second linkage arm and said chassis.

* * * * *